US 11,784,299 B2

(12) United States Patent
Choi et al.

(10) Patent No.: US 11,784,299 B2
(45) Date of Patent: Oct. 10, 2023

(54) ANODE FOR THERMAL BATTERY, APPARATUS FOR MANUFACTURING THE ANODE FOR THERMAL BATTERY, AND METHOD OF MANUFACTURING THE ANODE FOR THERMAL BATTERY

(71) Applicant: AGENCY FOR DEFENSE DEVELOPMENT, Daejeon (KR)

(72) Inventors: Yu Song Choi, Daejeon (KR); Tae Young Ahn, Daejeon (KR); Jang Hyeon Cho, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 200 days.

(21) Appl. No.: 17/053,011

(22) PCT Filed: Oct. 14, 2019

(86) PCT No.: PCT/KR2019/013412
§ 371 (c)(1),
(2) Date: Nov. 4, 2020

(87) PCT Pub. No.: WO2020/226241
PCT Pub. Date: Nov. 12, 2020

(65) Prior Publication Data
US 2021/0126239 A1      Apr. 29, 2021

(30) Foreign Application Priority Data

May 7, 2019  (KR) .................. 10-2019-0053268
May 7, 2019  (KR) .................. 10-2019-0053269
May 7, 2019  (KR) .................. 10-2019-0053270

(51) Int. Cl.
*H01M 4/12*      (2006.01)
*H01M 4/10*      (2006.01)
*H01M 6/36*      (2006.01)

(52) U.S. Cl.
CPC .............. *H01M 4/12* (2013.01); *H01M 4/10* (2013.01); *H01M 6/36* (2013.01)

(58) Field of Classification Search
CPC ............ H01M 4/12; H01M 4/10; H01M 6/36
(Continued)

(56) References Cited

U.S. PATENT DOCUMENTS 7,354,678 B2     4/2008   Machado et al.
8,277,974 B2 *  10/2012   Kumar .................. H01M 4/625
                                                        429/206

(Continued)

FOREIGN PATENT DOCUMENTS

EP       1279200 B1 *  7/2006  ......... C22C 33/0278
JP       59-169074        9/1984
(Continued)

OTHER PUBLICATIONS

Seong (translation) (Year: 2019).*
(Continued)

*Primary Examiner* — Matthew T Martin
*Assistant Examiner* — Paul Christian St Wyrough
(74) *Attorney, Agent, or Firm* — Ladas & Parry, LLP (57) ABSTRACT

A lithium anode of a thermal battery may include a metal alloy foam in which a plurality of pores is formed and including nickel (Ni), iron (Fe), chromium (Cr), and aluminum (Al) mixed in a predetermined composition ratio, and lithium impregnated into the metal alloy foam in a molten state and accommodated in the pores, wherein the chromium in the composition ratio may facilitate the impregnation of the lithium into the pores and reduce the reactivity of the metal alloy foam to the lithium at an operating temperature of the thermal battery, and the aluminum in the composition (Continued)

ratio may facilitate the impregnation of the lithium into the pores and prevent the lithium from penetrating into a surface of the metal alloy foam.

9 Claims, 10 Drawing Sheets

(58) Field of Classification Search
USPC .......................................................... 429/209
See application file for complete search history.

(56) References Cited

U.S. PATENT DOCUMENTS

| | | | |
|---|---|---|---|
| 9,346,240 | B2 | 5/2016 | Walther et al. |
| 2011/0206992 | A1 | 8/2011 | Campbell et al. |

FOREIGN PATENT DOCUMENTS

| | | | | |
|---|---|---|---|---|
| JP | 1-122562 | | 5/1989 | |
| JP | 2-299163 | | 12/1990 | |
| JP | 7-134997 | | 5/1995 | |
| JP | 8-78023 | | 3/1996 | |
| JP | 2012-9440 | | 1/2012 | |
| KR | 2003-0014211 | | 2/2003 | |
| KR | 10-2012-0014825 | | 2/2012 | |
| KR | 10-2014-0014169 | | 2/2014 | |
| KR | 10-1449597 | | 10/2014 | |
| KR | 10-1484042 | | 1/2015 | |
| KR | 10-1868574 | | 6/2018 | |
| KR | 10-1920850 | | 11/2018 | |
| KR | 10-1967443 | | 4/2019 | |
| KR | 1967443 | B1 * | 4/2019 | ............ H01M 10/39 |
| WO | WO-2016013704 | A1 * | 1/2016 | .......... H01M 2/1673 |

OTHER PUBLICATIONS

Kumar (numbered) (Year: 2012).*
Song (numbered) (Year: 2016).*
International Search Report for PCT/KR2019/013412 dated Feb. 6, 2020 and its English translation by Google Translate.
Written Opinion of the International Searching Authority for PCT/KR2019/013412 dated Feb. 6, 2020 and its English translation by Google Translate.
Notice of Allowance dated Jan. 3, 2020 for Korean Patent Application No. 10-2019-0053268 and its English translation by Google Translate.
Office Action dated Jul. 5, 2019 for Korean Patent Application No. 10-2019-0053268 and its English translation by Google Translate.
Notice of Allowance dated Nov. 11, 2019 for Korean Patent Application No. 10-2019-0053269 and its English translation by Google Translate.
Office Action dated Jul. 5, 2019 for Korean Patent Application No. 10-2019-0053269 and its English translation by Google Translate.
Notice of Allowance dated Jan. 3, 2020 for Korean Patent Application No. 10-2019-0053270 and its English translation by Google Translate.
Office Action dated Jul. 5, 2019 for Korean Patent Application No. 10-2019-0053270 and its English translation by Google Translate.
Notice of Allowance dated August 26, 2020 for Korean Patent Application No. 10-2020-0025523 and its English translation by Google Translate.
Office Action dated April 14, 2020 for Korean Patent Application No. 10-2020-0025523 and its English translation by Google Translate.

* cited by examiner

ANODE FOR THERMAL BATTERY, APPARATUS FOR MANUFACTURING THE ANODE FOR THERMAL BATTERY, AND METHOD OF MANUFACTURING THE ANODE FOR THERMAL BATTERY

CROSS-REFERENCE TO RELATED APPLICATIONS

This application is the U.S. National Stage of International Patent Application No. PCT/KR2019/013412 filed on Oct. 14, 2019, which claims the priority to Korean Patent Application No. 10-2019-0053268 filed in the Korean Intellectual Property Office on May 7, 2019, Korean Patent Application No. 10-2019-0053269 filed in the Korean Intellectual Property Office on May 7, 2019, and Korean Patent Application No. 10-2019-0053270 filed in the Korean Intellectual Property Office on May 7, 2019, the entire contents of which are incorporated herein by reference.

TECHNICAL FIELD

The disclosure relates to an anode for a thermal battery, an apparatus for manufacturing an anode for a thermal battery, and a method of manufacturing an anode for a thermal battery.

BACKGROUND ART

A thermal battery is a storage-type primary battery which is maintained in a deactivated state at room temperature and then activated within a few seconds by melting a solid electrolyte by the ignition of a heat source. Accordingly, the thermal battery may be stored for more than 10 years without any reduction in performance because almost no self-discharging occurs during storage. In addition, the thermal battery is mainly used as a power source for guided weapons and space vehicles due to its structural stability, reliability, or the like and thus may withstand vibrations, shocks, low-temperature conditions, and high-temperature conditions.

In particular, in the case of guided weapons, the average lifespan thereof is 15 years or more, and power is used only when a weapon is fired. Therefore, no self-discharging occurrence is an essential requirement of a power source for guided weapons. In addition, the power source of guided weapons should also have lightweight for flight. An electrolyte is in a solid-state when a thermal battery is deactivated. Therefore, self-discharging may be prevented and the thermal battery may be used as a power source for a guided weapon.

Lithium-silicon (Li—Si) alloys, liquid lithium in which iron powder is mixed with molten lithium, and the like are used as anode materials for thermal batteries. However, Li—Si alloys are manufactured through a powder molding method and have limitations in molding. In addition, an open-circuit voltage of lithium-silicon (Li—Si) alloys is 1.9 V, which is less than an open-circuit voltage of a liquid lithium electrode, that is, 2.0 V. Liquid lithium electrodes include pure lithium with excellent theoretical capacity. However, a reduction in the specific capacity inevitably occurs in the case of using liquid lithium electrodes mixed with an excess amount of iron powder to prevent leakage of molten lithium at a high temperature, which is an operating condition of a thermal battery.

Accordingly, to solve the above-stated problems, researches into other types of anode materials for thermal batteries to replace the existing Li—Si alloys and the liquid lithium electrodes have been actively conducted.

As documents of the related art, Korean Registered Patent No. 10-1449597 disclosed lithium impregnated into a metal alloy foam in which eutectic salts are coated and Japanese Published Patent No 1996-078023 disclosed lithium impregnated into a porous nickel substrate.

DESCRIPTION OF EMBODIMENTS

Technical Problem

According to an embodiment, a lithium anode is manufactured by immersing a metal alloy foam, which is prepared in a predetermined composition ratio including chromium and aluminum, in molten lithium, and a thermal battery including the lithium anode is provided.

According to another embodiment, a lithium anode is manufactured by immersing a metal alloy foam, which is prepared in a predetermined composition ratio including chromium and molybdenum, in molten lithium, and a thermal battery including the lithium anode is provided.

According to another embodiment, a method of manufacturing an anode of a thermal battery including a metal alloy foam in which a series of roll-to-roll operations are sequentially and continuously performed on the metal alloy foam, and an apparatus for manufacturing an anode of a thermal battery are provided.

Problems to be solved are not limited to the above-stated problems and one of ordinary skill in the art will understand other problems from the following descriptions and the accompanying drawings.

Solution to Problem

According to an embodiment, provided is a lithium anode of a thermal battery, the lithium anode including a metal alloy foam in which a plurality of pores are formed and including nickel (Ni), iron (Fe), chromium (Cr), and aluminum (Al) mixed in a predetermined composition ratio, and lithium impregnated into the metal alloy foam in a molten state and accommodated in the pores, wherein the chromium in the composition ratio may facilitate the impregnation of the lithium into the pores and reduce the reactivity of the metal alloy foam with the lithium at an operating temperature of the thermal battery, and the aluminum in the composition ratio may facilitate the impregnation of the lithium into the pores and prevent the lithium from penetrating into a surface of the metal alloy foam.

A first composition ratio of the metal alloy foam may include, with respect to 100 parts by weight of the metal alloy foam, 22 to 42 parts by weight of the nickel, 9 to 19 parts by weight of the iron, 21 to 41 parts by weight of the chromium, and 9 to 29 parts by weight of the aluminum.

A second composition ratio of the metal alloy foam may include, with respect to 100 parts by weight of the metal alloy foam, 26 to 46 parts by weight of the nickel, 6 to 26 parts by weight of the iron, 18 to 38 parts by weight of the chromium, and 10 to 30 parts by weight of the aluminum.

The metal alloy foam may further include an oxygen element (O) to facilitate the impregnation of the lithium through oxidation, and a third composition ratio of the metal alloy foam may include, with respect to 100 parts by weight of the metal alloy foam, 10 to 30 parts by weight of the nickel, 2 to 22 parts by weight of the iron, 9 to 29 parts by weight of the chromium, 2 to 22 parts by weight of the aluminum, and 9 to 29 parts by weight of the oxygen element.

The pores may each have a diameter of 250 μm to 6000 μm.

According to another embodiment, provided is a thermal battery including a lithium anode including a metal alloy foam in which a plurality of pores are formed and including nickel (Ni), iron (Fe), chromium (Cr), and aluminum (Al) mixed in a predetermined composition ratio and lithium impregnated into the metal alloy foam in a molten state and accommodated in the pores, an anode current collector arranged on one surface of the lithium anode, an electrolyte arranged on another surface of the lithium anode, a cathode arranged opposite to the lithium anode with respect to the electrolyte, and a cathode current collector arranged opposite to the electrolyte with respect to the cathode.

According to another embodiment, provided is a method of manufacturing a thermal battery, the method including melting lithium in a glove box under an argon atmosphere, immersing a metal alloy foam, in which a plurality of pores are formed and including nickel (Ni), iron (Fe), chromium (Cr), and aluminum (Al) mixed in a predetermined composition ratio, in the molten lithium, and arranging an anode current collector on one surface of the metal alloy foam and sequentially stacking an electrolyte, a cathode, and a cathode current collector on another surface of the metal alloy foam.

A surface pre-treatment operation using eutectic salts may not be performed on the surfaces of the metal alloy foam.

The molten lithium may be impregnated into the metal alloy foam within five minutes in the immersing of the metal alloy foam in the molten lithium.

According to another embodiment, provided is a lithium anode of a thermal battery, the lithium anode including a metal alloy foam in which a plurality of pores are formed and including nickel (Ni), iron (Fe), chromium (Cr), and molybdenum (Mo) mixed in a predetermined composition ratio, and lithium impregnated into the metal alloy foam in a molten state and accommodated in the pores, wherein the chromium in the composition ratio may facilitate the impregnation of the lithium into the pores, and the molybdenum in the composition ratio may prevent the metal alloy foam from reacting with lithium and melting.

A first composition ratio of the metal alloy foam may include, with respect to 100 parts by weight of the metal alloy foam, 47 to 67 parts by weight of the nickel, 1 to 33 parts by weight of the iron, 13 to 33 parts by weight of the chromium, and 1 to 14 parts by weight of the molybdenum.

A second composition ratio of the metal alloy foam may include, with respect to 100 parts by weight of the metal alloy foam, 47 to 67 parts by weight of the nickel, 1 to 33 parts by weight of the iron, 13 to 33 parts by weight of the chromium, 1 to 14 parts by weight of the molybdenum, and 1 to 11 parts of weight of silicon.

The lithium anode does not include a cup or mesh to maintain the shape of the metal alloy foam.

According to another embodiment, provided is a thermal battery including a lithium anode including a metal alloy foam in which a plurality of pores are formed and including nickel (Ni), iron (Fe), chromium (Cr), and molybdenum (Mo) mixed in a predetermined composition ratio and lithium impregnated into the metal alloy foam in a molten state and accommodated in the pores, an anode current collector arranged on one surface of the lithium anode, an electrolyte arranged on another surface of the lithium anode, a cathode arranged opposite to the lithium anode with respect to the electrolyte, and a cathode current collector arranged opposite to the electrolyte with respect to the cathode.

According to another embodiment, provided is a method of manufacturing a thermal battery, the method including melting lithium in a glove box under an argon atmosphere, immersing a metal alloy foam, in which a plurality of pores are formed and including nickel (Ni), iron (Fe), chromium (Cr), and molybdenum (Mo) mixed in a predetermined composition ratio, in the molten lithium, and arranging an anode current collector on one surface of the metal alloy foam and sequentially stacking an electrolyte, a cathode, and a cathode current collector on another surface of the metal alloy foam.

According to another embodiment, provided is a method of manufacturing an anode of a thermal battery, the method including providing a metal alloy foam wrapped around a first roller to a conveying unit, passing the metal alloy foam through a container containing molten lithium, according to a movement of the conveying unit, and cooling the lithium impregnated into the metal alloy foam by spraying argon by an argon blower.

The method may further include processing the metal alloy foam to a certain thickness by pressing the metal alloy foam, in which the lithium is impregnated.

The method may further include recovering the metal alloy foam in which the lithium is impregnated to wrap the metal alloy foam around a second roller.

A diameter of the first roller may be 16 cm to 30 cm.

A rotation speed of the first roller may be 0.02 rpm to 2 rpm.

A rotation speed of the press roller may be 0.1 rpm to 2 rpm.

The argon blower may spray argon at a pressure of 50 psi to 200 psi.

According to another embodiment, provided is an apparatus for manufacturing an anode of a thermal battery, the apparatus including a first roller releasing a wrapped metal alloy foam and supplying the metal alloy foam to a conveying unit, according to a rotation of the first roller, a container containing molten lithium and through which the metal alloy foam passes according to a movement of the conveying unit, and an argon blower spraying argon to cool the lithium impregnated into the metal alloy foam moving along the conveying unit.

The apparatus for manufacturing an anode of a thermal battery may further include a press roller pressing and processing the metal alloy foam in which the lithium is impregnated to have a certain thickness.

The apparatus for manufacturing an anode of a thermal battery may further include a second roller recovering and wrapping the metal alloy foam in which the lithium is impregnated.

Advantageous Effects of Disclosure

According to an embodiment, a configuration of a metal alloy foam in which nickel, iron, chromium, and aluminum are included, instead of a single material such as nickel or iron, is designed and used, such that additional materials such as eutectic salts or silicon are not deposited, and the alloy foam has an excellent impregnation property of lithium. Accordingly, when an existing molten salt coating operation is used, impregnating lithium is a complicated operation that requires 24 hours or more, and using a metal alloy foam with a designed composition has the advantage of impregnating lithium within 5 minutes, which may drastically reduce the operation time and cost. In addition, nitriding of lithium may be prevented and the long-term storage property of a thermal battery may be improved by including aluminum in the composition of the alloy.

A metal alloy foam in which nickel, iron, chromium, and molybdenum are present together according to an embodiment may prevent corrosion of the metal alloy foam by lithium and maintain a shape thereof. Accordingly, cups and meshes to prevent lithium leakage may not be used.

An apparatus and method for manufacturing an anode of a thermal battery, according to an embodiment, may produce a large amount of the anode of the thermal battery and reduce operation time and manufacturing cost by introducing a roll-to-roll operation.

Effects are not limited to the above-stated effects, and effects not stated will be clearly understood by one of ordinary skill in the art from the disclosure and the accompanying drawings.

BEST MODE

According to an embodiment, provided is a lithium anode of a thermal battery, the lithium anode including a metal alloy foam in which a plurality of pores are formed and including nickel (Ni), iron (Fe), chromium (Cr), and aluminum (Al) mixed in a predetermined composition ratio, and lithium impregnated into the metal alloy foam in a molten state and accommodated in the pores, wherein the chromium in the composition ratio may facilitate the impregnation of the lithium into the pores and reduce the reactivity of the metal alloy foam with the lithium at an operating temperature of the thermal battery, and the aluminum in the composition ratio may facilitate the impregnation of the lithium into the pores and prevent the lithium from penetrating into a surface of the metal alloy foam.

According to another embodiment, provided is a lithium anode of a thermal battery, the lithium anode including a metal alloy foam in which a plurality of pores are formed and including nickel (Ni), iron (Fe), chromium (Cr), and molybdenum (Mo) mixed in a predetermined composition ratio, and lithium impregnated into the metal alloy foam in a molten state and accommodated in the pores, wherein the chromium in the composition ratio may facilitate the impregnation of the lithium into the pores, and the molybdenum in the composition ratio may prevent the metal alloy foam from reacting with lithium and melting.

According to another embodiment, provided is a method of manufacturing an anode of a thermal battery, the method including providing a metal alloy foam wrapped around a first roller to a conveying unit, passing the metal alloy foam through a container containing molten lithium, according to a movement of the conveying unit, and cooling the lithium impregnated into the metal alloy foam by spraying argon by an argon blower.

MODE OF DISCLOSURE

A detailed embodiment of the disclosure will be described in detail below with reference to the drawings. However, this is not intended to limit the inventive concept to disclosed embodiments, and one of ordinary skill in the art may easily propose other backward inventions or other embodiments within the scope of the spirit of the disclosure by adding, changing or deleting other components within the scope of the same spirit, and those embodiments are also included within the scope of the disclosure.

In addition, components having the same functions within the same scope appearing in the drawings of respective embodiments will be described using the same reference numerals.

Terms used in the embodiments have been selected from general terms that are currently widely used considering functions in the disclosure, but the terms may vary depending on the intention or precedent of one of ordinary skill in the art or the appearance of new technologies. In addition, in certain cases, some terms are arbitrarily selected by the applicant, and in this case, the meanings of the terms will be described in detail in the description of the disclosure. Accordingly, the terms used in the disclosure should be defined based on the meaning of the term and the contents of the disclosure, rather than the name of the simple term.

Throughout the specification, when a portion "includes" an element, another element may be further included, rather than excluding the existence of the other element, unless otherwise described. In addition, terms such as "unit" and "module" described in the disclosure mean a unit that processes at least one function or operation, which may be implemented in hardware or software, or a combination of hardware of software.

Hereinafter, embodiments will now be described more fully with reference to the accompanying drawings so that one of the ordinary skills in the art may easily practice. The inventive concept may, however, be embodied in many different forms and should not be construed as being limited to the embodiments set forth herein.

Figure 1:
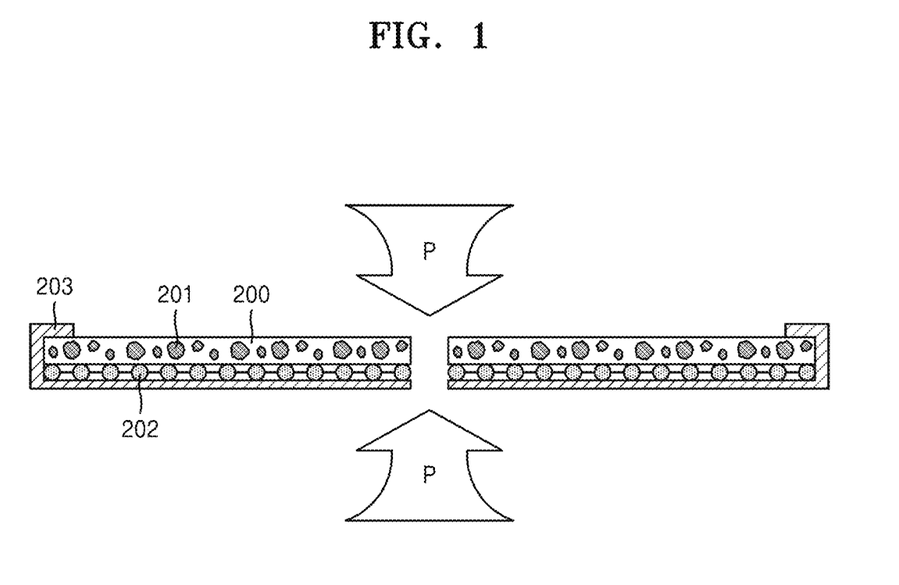
FIG. 1 is a cross-sectional view of a lithium anode which has been commercialized.

FIG. 1 is a cross-sectional view of a lithium anode that has been commercialized. Referring to FIG. 1, an electrode in which lithium 200 and iron powder 201 are mixed being contained in a nickel mesh 202 and a cup 203, including nickel or iron is shown.

An existing commercially available lithium anode is produced through an operation in which iron powder is dividedly injected into molten lithium and an ingot is manufactured compressed, rolled, and punched from the lithium in a solidified state in which the iron powder is mixed. In addition, the lithium anode is manufactured to include the nickel mesh 202 and the cup 203, including nickel or iron, which may accommodate lithium therein.

A liquid lithium electrode undergoes a phase change from a solid to a liquid at 400° C. to 500° C., which is an active temperature of a thermal battery, i.e., the melting temperature of pure Li is 182° C. Lithium in the liquid state has a flow property, and when the lithium flows to a cathode, a short circuit of a battery may occur.

To control the flow property of the lithium, an existing lithium anode is manufactured by mixing with a large amount of the iron powder 201. The iron powder 201 may provide a supporting force in which molten liquid lithium may maintain a shape thereof.

However, since an operation of physically mixing the iron powder 201 is inevitably performed, the iron powder 201 or the lithium 200 may be unevenly distributed when the mixture is completed in an ingot form. Accordingly, for stable operation, an excessive amount of the iron powder 201 is mixed and as a result, the lithium specific capacity is reduced.

On the one hand, it is common to assemble a thermal battery under a pressurized environment to reduce contact resistance. When the lithium 200 is melted by an operation of the thermal battery in which the lithium 200 and the iron powder 201 are partially unevenly mixed, deformation of an electrode inevitably occurs due to a pressing force applied during the assembly of the thermal battery. When the electrode is deformed, the molten lithium 200 may leak and move to the cathode, causing a short circuit of the battery.

Therefore, the existing lithium electrode is manufactured by using the nickel mesh 202 and the cup 203, including nickel or iron, to prevent leakage of lithium due to such deformation.

However, since the weight of the cup 203 including nickel or iron and the nickel mesh 202 accounts the total weight of the anode for 30 wt % to 40 wt %, a reduction in the specific capacity of lithium inevitably occurs. In addition, as a result of an electrode analysis after discharge was completed, the iron powder was observed to be more aggregated than before the discharge. The structural stability of the battery may not be ensured when discharged in a pressurized environment.

To solve these problems, a lithium anode according to an embodiment is manufactured through the operation of impregnating lithium in a metal alloy foam manufactured in a predetermined composition ratio. Accordingly, in a method of manufacturing the lithium anode according to an embodiment, the reactivity of the metal alloy foam to the lithium is lowered to improve stability, and wettability to the lithium is improved. In addition, the cup 203 and the mesh 202 which were essentially necessary, are not used and a surface treatment using eutectic salts is omitted. As a result, the lithium anode exhibits a significant increase in the specific capacity, a manufacturing operation thereof is simplified, and the productivity is improved, as compared to the existing lithium anode.

Hereinafter, the lithium anode according to embodiments and a method of manufacturing the same will now be described in more detail.

Figure 2:
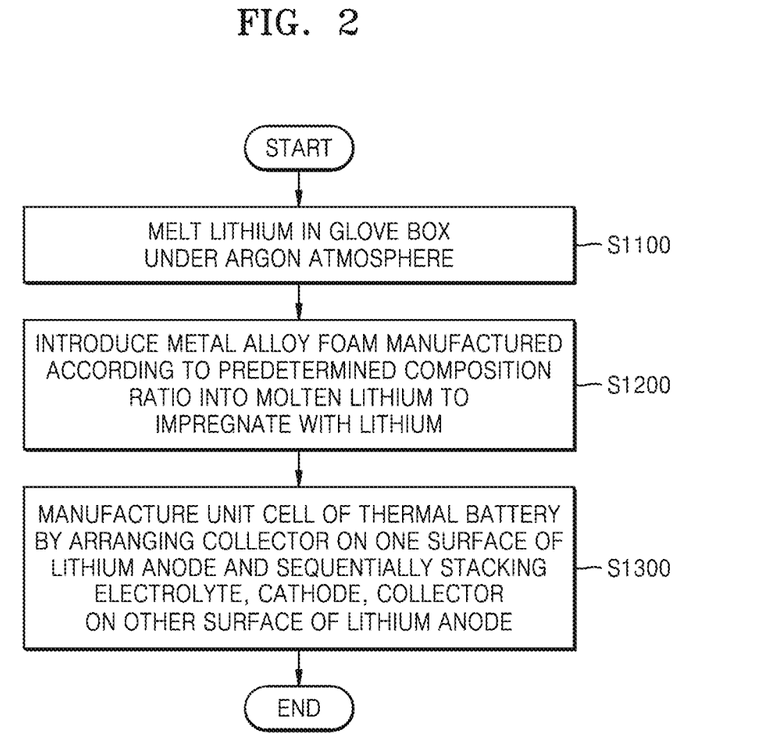
FIG. 2 is a flowchart illustrating a method of manufacturing a thermal battery using an anode including a metal alloy foam according to an embodiment.
Figure 3A:
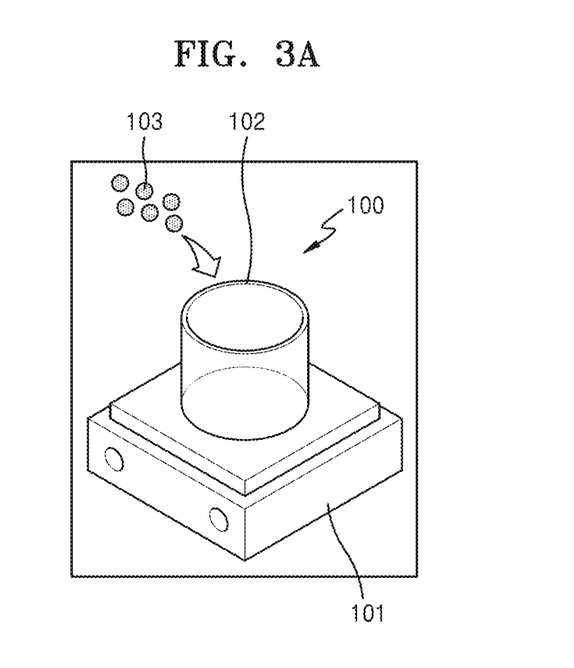
FIGS. 3A and 3B are a diagram illustrating a method of manufacturing a metal alloy foam according to an embodiment.
Figure 3B:
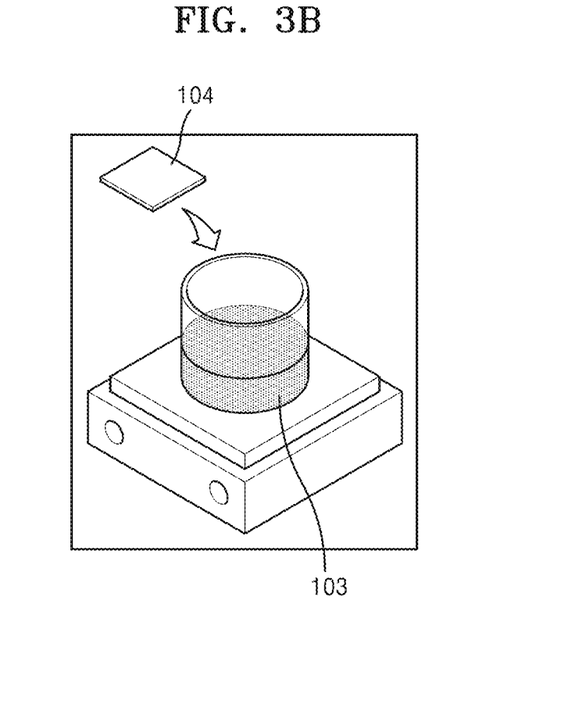

FIG. 2 is a flowchart illustrating a method of manufacturing a thermal battery using an anode including a metal alloy foam according to an embodiment and FIG. 3 is a diagram illustrating a method of manufacturing a metal alloy foam according to an embodiment.

Referring to FIGS. 2 and 3, first, in operation S1100, lithium is heated and melted in a glove box under an argon atmosphere. Since lithium may easily react with oxygen and water in air, a heating source 101 is installed in the glove box such that lithium may be melted in a glove box 100 substituted with the argon atmosphere. For example, the heating source 101 may be a heating device such as a hot plate, an induction, or the like. The heating source 101 heats a container 102 to 250° C. to 350° C., which is above the melting point (180° C.) of lithium. For example, container 102 may be manufactured by using iron or stainless steel. Then, lithium is introduced into container 102 to melt. An impeller uniformly stirs the molten lithium. The impeller is removed when the lithium is completely melted.

Thereafter, in operation S1200, a metal alloy foam 104 manufactured in a predetermined composition ratio is introduced into the molten lithium, and the molten lithium is impregnated into pores formed in the metal alloy foam 104. Accordingly, a lithium anode in which the lithium is impregnated into the metal alloy foam 104 is manufactured.

Compared to an existing liquid lithium electrode including a lithium-silicon (Li—Si) alloy and iron powder, when the metal alloy foam 104 is used, the size of the pores (cells) in the metal alloy foam 104 may be controlled to control an impregnation amount of the lithium. Therefore, the design of a capacity thereof is freer than the liquid lithium electrode including the iron powder.

Reducing the time required in impregnating liquid lithium in a molten state into the metal alloy foam 104 is an important technical problem because it is directly related to a reduction in the operation cost and improvement of productivity. Through the composition design of the metal alloy foam 104, a composition that allows the molten lithium to be impregnated within a short time.

The metal alloy foam 104 is impregnated with the molten lithium (Li) to form pores which may accommodate the lithium. At this time, the pores have a diameter of 250 μm to 600 μm. In detail, the pores have a diameter of 400 μm to 1200 μm.

The metal alloy foam 104 includes nickel (Ni), iron (Fe), chromium (Cr), and aluminum (Al), which are mixed in a predetermined composition ratio.

Nickel is difficult to be used alone at a high operating temperature of a thermal battery due to the high reactivity thereof with lithium. In addition, nickel is not suitable as an electrode structure of a thermal battery in a pressurized environment due to the low strength thereof.

Iron has low reactivity with lithium, but iron is difficult to be impregnated with lithium due to poor wettability with lithium.

Accordingly, the metal alloy foam 104 according to an embodiment may further include chromium and aluminum in addition to nickel and iron to maintain a low reactivity with lithium and to facilitate impregnation of lithium.

The metal alloy foam 104, in which chromium is mixed, is excellent in low reactivity with lithium at a high temperature. The metal alloy foam 104, in which chromium is mixed, has low reactivity with lithium at a high temperature at a level of iron. Accordingly, the metal alloy foam 104, in which chromium is mixed, may ensure stability at an operating temperature of a thermal battery. In addition, the metal alloy foam 104, in which chromium is mixed, is easily impregnated with lithium.

In the metal alloy foam 104, in which aluminum is mixed, the surface of the metal alloy foam 104 may react minutely with lithium, but it has been observed that lithium does not penetrate into the surface of the metal alloy foam 104.

In other words, the metal alloy foam 104, in which aluminum is mixed, shows some reactions on the surface, but a reaction does not occur deeper than the surface of the metal alloy foam 104. Therefore, the metal alloy foam 104 may maintain the structure thereof.

Accordingly, the metal alloy foam 104, in which aluminum is mixed, may be used as an electrode structure of a thermal battery by protecting from reactions with lithium. In addition, the metal alloy foam 104, in which aluminum is mixed, facilitates the impregnation of lithium. In addition, the metal alloy foam 104, in which aluminum is mixed, may prevent nitriding.

In other words, the metal alloy foam 104, in which chromium and aluminum are mixed, facilitates the impregnation of lithium. As lithium is melted at 300° C. to 400° C., which is a melting temperature of lithium, is higher than the melting temperature of lithium, 182° C., the lithium is impregnated into the metal alloy foam 104, in which chromium and aluminum are mixed.

A first composition ratio of the metal alloy foam 104 includes, with respect to 100 parts by weight of the metal alloy foam 104, 22 to 42 parts by weight of the nickel, 9 to 19 parts by weight of the iron, 21 to 41 parts by weight of the chromium, and 9 to 29 parts by weight of the aluminum.

A second composition ratio of the metal alloy foam 104 includes, with respect to 100 parts by weight of the metal alloy foam 104, 26 to 46 parts by weight of the nickel, 6 to 26 parts by weight of the iron, 18 to 38 parts by weight of the chromium, and 10 to 30 parts by weight of the aluminum.

The metal alloy foam 104 may further include an oxygen element (O) to facilitate the impregnation of lithium through oxidation. At this time, a third composition ratio of the metal alloy foam 104 includes, with respect to 100 parts by weight of the metal alloy foam 104, 10 to 30 parts by weight of the nickel, 2 to 22 parts by weight of the iron, 9 to 29 parts by weight of the chromium, 2 to 22 parts by weight of the aluminum, and 9 to 29 parts by weight of the oxygen element.

In addition, according to another embodiment, the metal alloy foam 104 may further include chromium (Cr), molybdenum (Mo), and silicon (Si) in addition to nickel and iron to facilitate the impregnation of lithium and, at the same time, prevent the metal alloy foam 104 from corrosion.

An existing metal alloy foam including nickel and iron has a problem of melting due to a reaction with the molten lithium at an operating temperature of a thermal battery. Due to the reaction, a reduction in the capacity of the lithium may occur while the discharge of the thermal battery is in progress. In particular, the metal alloy foam melts due to a reaction with lithium at 500° C. to 550° C., which is a discharge temperature of the thermal battery. Accordingly, the existing metal alloy foam including nickel and iron must be equipped with the mesh 202 and the cup 203 configured to prevent lithium leakage.

However, when molybdenum is mixed with the metal alloy foam 104, the metal alloy foam 104 is stable because it does not react with the molten lithium at an operating temperature of the thermal battery and maintains the shape thereof. Accordingly, the metal alloy foam 104, in which molybdenum is mixed, may stably maintain the structure thereof to prevent lithium leakage and may remove the mesh 202 and the cup 203, which accounts for up to 30% of a total anode weight, thereby significantly increasing the specific capacity of the lithium.

A fourth composition ratio of the metal alloy foam 104 including molybdenum includes, with respect to 100 parts by weight of the metal alloy foam 104, 47 to 67 parts by weight of nickel, 13 to 33 parts by weight of chromium, and 1 to 14 parts by weight of molybdenum.

A fifth composition ratio of the metal alloy foam 104 including molybdenum includes, with respect to 100 parts by weight of the metal alloy foam 104, 47 to 67 parts by weight of nickel, 13 to 33 parts by weight of chromium, 1 to 14 parts by weight of molybdenum, and 1 to 11 parts by weight of silicon.

The metal alloy foam 104 manufactured in a predetermined composition ratio has better wettability to lithium than the metal alloy foam 104, in which only nickel and iron are mixed. For example, the molten lithium may be completely impregnated into the metal alloy foam 104 within tens of seconds and up to 5 minutes.

In addition, in the related art, attempts have been made to coat eutectic salts on the surface of nickel foam, deposit materials such as silicon or gold on the surface of a nickel foam by using chemical vapor deposition (CVD), or the like to improve the wettability to lithium. However, in this case, the operation cost and time may be increased, and as a result, leading to an increase in the production cost of a thermal battery.

On the other hand, the wettability to the molten lithium may be improved without performing an additional surface pre-treatment including eutectic salts on the surface of the metal alloy foam 104 manufactured in a predetermined composition ratio according to an embodiment. Accordingly, a lithium anode for a high-quality thermal battery may be manufactured by simply immersing the metal alloy foam 104 in the molten lithium without the need for a prior operation such as eutectic salt coating or silicon deposition.

In addition, the metal alloy foam 104 manufactured according to the predetermined composition ratio has a strength capable of withstanding a pressure of 4 kg/cm$^2$ to 7 kg/cm$^2$ applied during a manufacturing operation of the thermal battery. Accordingly, the metal alloy foam 104 may maintain the shape thereof without occurring deformation in a pressurized environment, and no leakage of lithium occurs. Therefore, a unit cell of a thermal battery may be configured without using a nickel and iron cup 203 and the nickel mesh 202 which may prevent lithium leakage.

Figure 6:
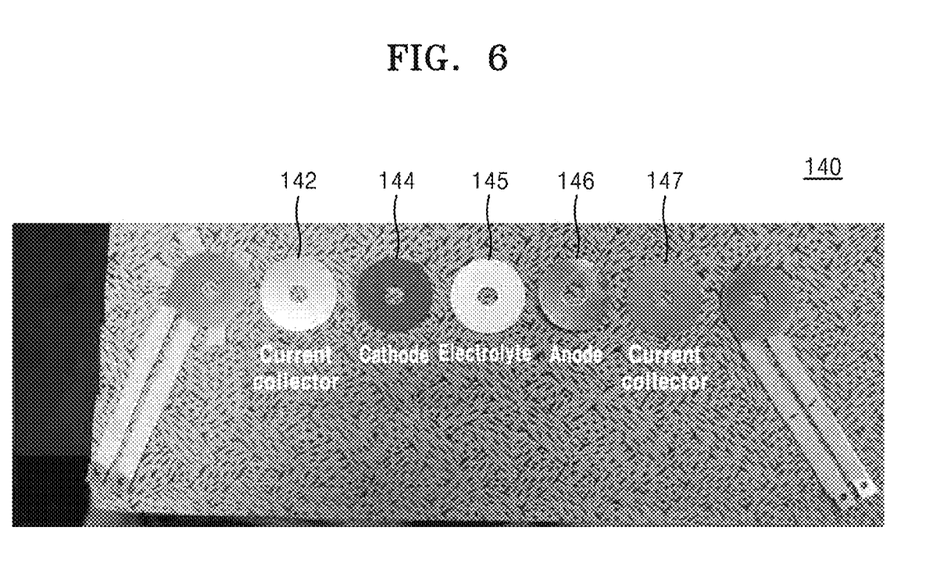
FIG. 6 is a diagram of a thermal battery and components thereof manufactured according to an embodiment.

Hereinafter, in operation S1300, a unit cell 140 of a thermal battery is manufactured by arranging an anode current collector 147 on one surface of a lithium anode 146 and sequentially stacking an electrolyte 145, a cathode 144, and a cathode current collector 142 on the other surface of the lithium anode 146.

A thermal battery may be configured by at least one thermal battery cell 140. Thermal battery cells 140 are connected in series and as the number of thermal battery cells 140 connected increases, the output voltage of the thermal battery increases as well.

The thermal battery cell 140 may include the cathode 144, the electrolyte 145, the lithium anode 146, a heating source (not shown) configured to melt the electrolyte 145, the cathode current collector 142, and the anode current collector 147. The anode current collector 147 is arranged on one surface of the lithium anode 146. The cathode 144 is arranged on an opposite side of the lithium anode 146 based on the electrolyte 145. The cathode current collector 142 is arranged on the opposite side of the electrolyte 145 based on the cathode 144.

The heating source (not shown) may be arranged by being inserted between the cathode 144 and the current collector 142. At this time, for example, the cathode 144, the electrolyte 145, the anode 146, and the heating source (not shown) may be formed in a disk-shaped pellet to facilitate lamination.

The cathode current collector 142 and the anode current collector 147 serve as support that enables an active material to be present in the thermal battery in the form of an electrode plate, and the cathode 144 and the anode 146 play a role in transmitting electrical energy to connect electrical energy generated by a chemical to a circuit. The cathode current collector 142 and the anode current collector 147 may be manufactured by using, for example, metal plates such as stainless steel (SUS) and nickel (Ni) plates.

Figure 4A:
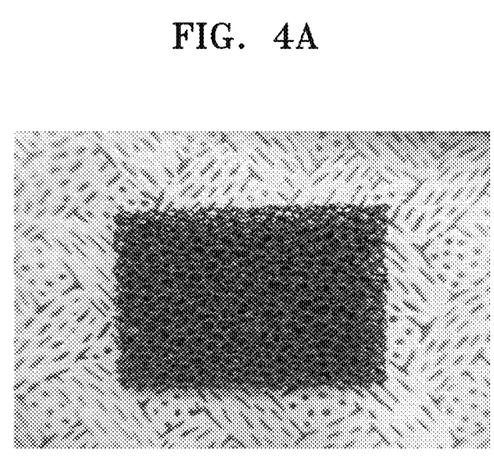
FIGS. 4A and 4B are a photograph of a metal alloy foam before and after impregnation with lithium according to an embodiment.
Figure 4B:
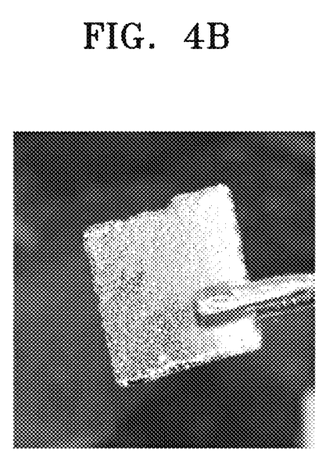
Figure 5A:
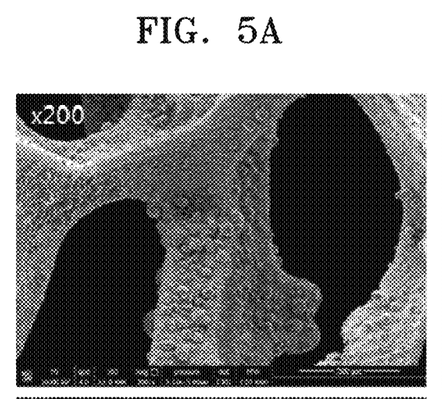
FIGS. 5A to 5D are a photograph, taken by an electron microscope, of a microstructure of a metal alloy foam before and after impregnation with lithium according to an embodiment.
Figure 5B:
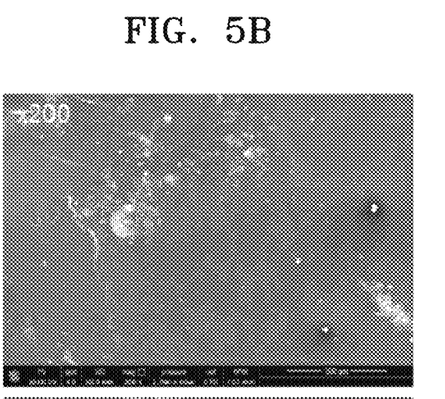
Figure 5C:
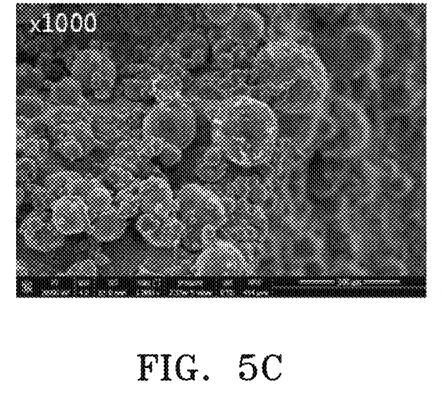
Figure 5D:
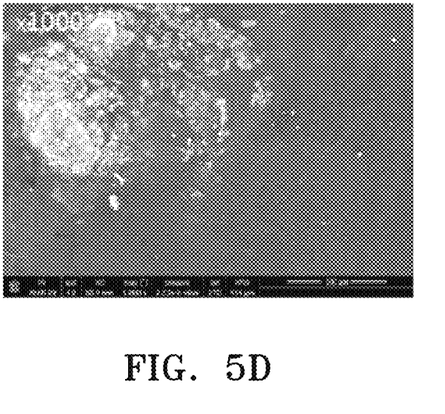

FIG. 4 is a photograph of a metal alloy foam before and after impregnation with lithium according to an embodiment, and FIG. 5 is a photograph, taken by an electron microscope, of a microstructure of a metal alloy foam before and after impregnation with lithium according to an embodiment.

Referring to FIG. 4, a plurality of pores is formed in a metal alloy foam before lithium is impregnated. When the metal alloy foam is immersed in molten lithium, it may be seen that the lithium penetrates into the plurality of pores and is end up with accommodation. Referring to FIG. 5, when a microstructure is confirmed, it may be confirmed that pores with a diameter of 400 μm to 1200 μm exist between the foams before the impregnation of lithium. After the lithium is completely impregnated, it may be confirmed that no more pores exist, which is different from that before the impregnation. Accordingly, it may be seen that lithium is impregnated into the alloy foam without empty spaces.

FIG. 6 is a diagram of a thermal battery and components thereof manufactured according to an embodiment. Referring to FIG. 6, the unit cell 140 of a thermal battery may be configured by arranging the anode current collector 147 on one surface of the lithium anode 146 including a metal alloy foam and sequentially stacking the electrolyte 145, the cathode 144, and the cathode current collector 142 on another surface of the lithium anode 146. At this time, the lithium anode 146 may configure the unit cell 140 of the thermal battery without using the nickel and iron cup 203 and the nickel mesh 202, which are commonly used in an existing lithium anode, according to the strength of the metal alloy foam.

Figure 7:
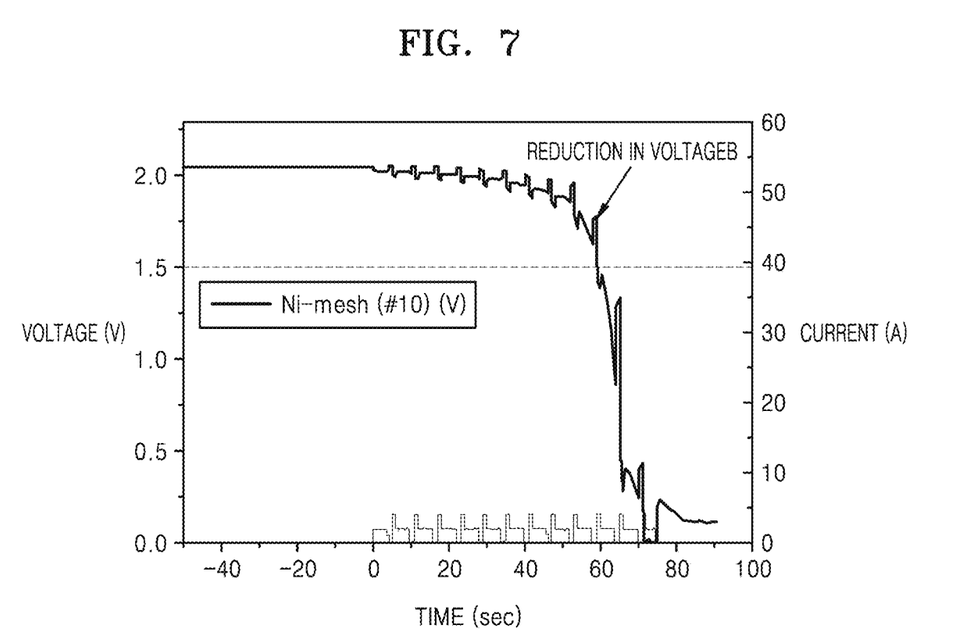
FIG. 7 is a discharge test result with respect to a unit cell of a thermal battery in the related art.
Figure 8:
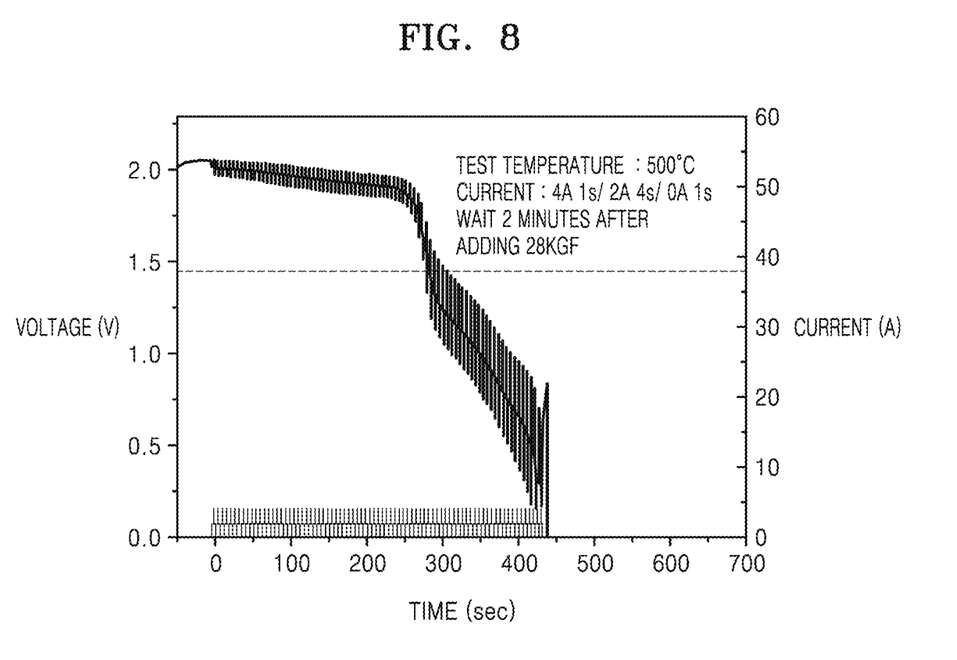
FIG. 8 is a discharge test result with respect to a unit cell of a thermal battery manufactured according to an embodiment.
Figure 9:
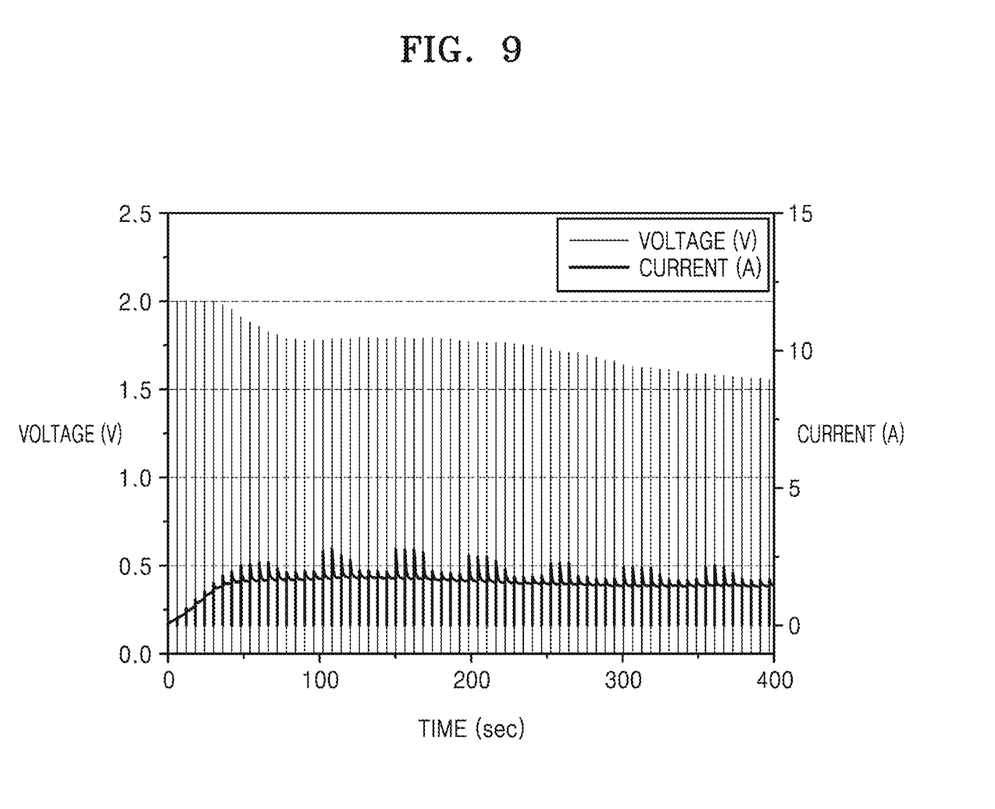
FIG. 9 is a discharge test result with respect to a unit cell of a thermal battery manufactured according to an embodiment.

FIG. 7 is a discharge test result with respect to a unit cell of a thermal battery in the related art, and FIGS. 8 to 9 are discharge test results with respect to a unit cell of a thermal battery manufactured according to an embodiment.

FIG. 7 is a discharge test result of an existing thermal battery including a metal alloy foam configured by nickel and iron. It was observed that the stability of the metal alloy foam in molten lithium is low when the thermal battery was discharged at a high temperature and the structure of the metal alloy foam collapsed. Accordingly, the voltage of the thermal battery rapidly decreased. Therefore, the existing metal alloy foam configured by nickel and iron must use cups and meshes to prevent the above problem.

FIG. 8 is a discharge test result of a thermal battery including a metal alloy foam including nickel, iron, chromium, and aluminum. As a result of the discharge test, an initial voltage was confirmed to be 2.06 V or more, which is a value that exceeds an initial voltage of a lithium-silicon alloy anode, which is currently widely used as an anode material of an existing thermal battery.

FIG. 9 is a discharge test result of a thermal battery including the metal alloy foam 104 including nickel, iron, chromium, and molybdenum. The metal alloy foam 104 has low reactivity to molten lithium even at a high temperature, and corrosion is prevented. Therefore, the structure of the metal alloy foam 104 is not deformed. Accordingly, the metal alloy foam 104 may be discharged without the cup 203 and mesh 202.

In the existing metal alloy foam configured by nickel and iron, the weight occupied by the cup 203 and the mesh 202 in the total weight of an anode of a thermal battery is at least 30% or more. The metal alloy foam 104 configured by nickel, iron, chromium and molybdenum does not include the cup 203 and mesh 202, such that the specific capacity compared to the same discharge performance may be increased over 30%. Accordingly, the range of application of thermal battery is greatly expanded due to the reduction in overall weight compared to the same performance.

Figure 10:
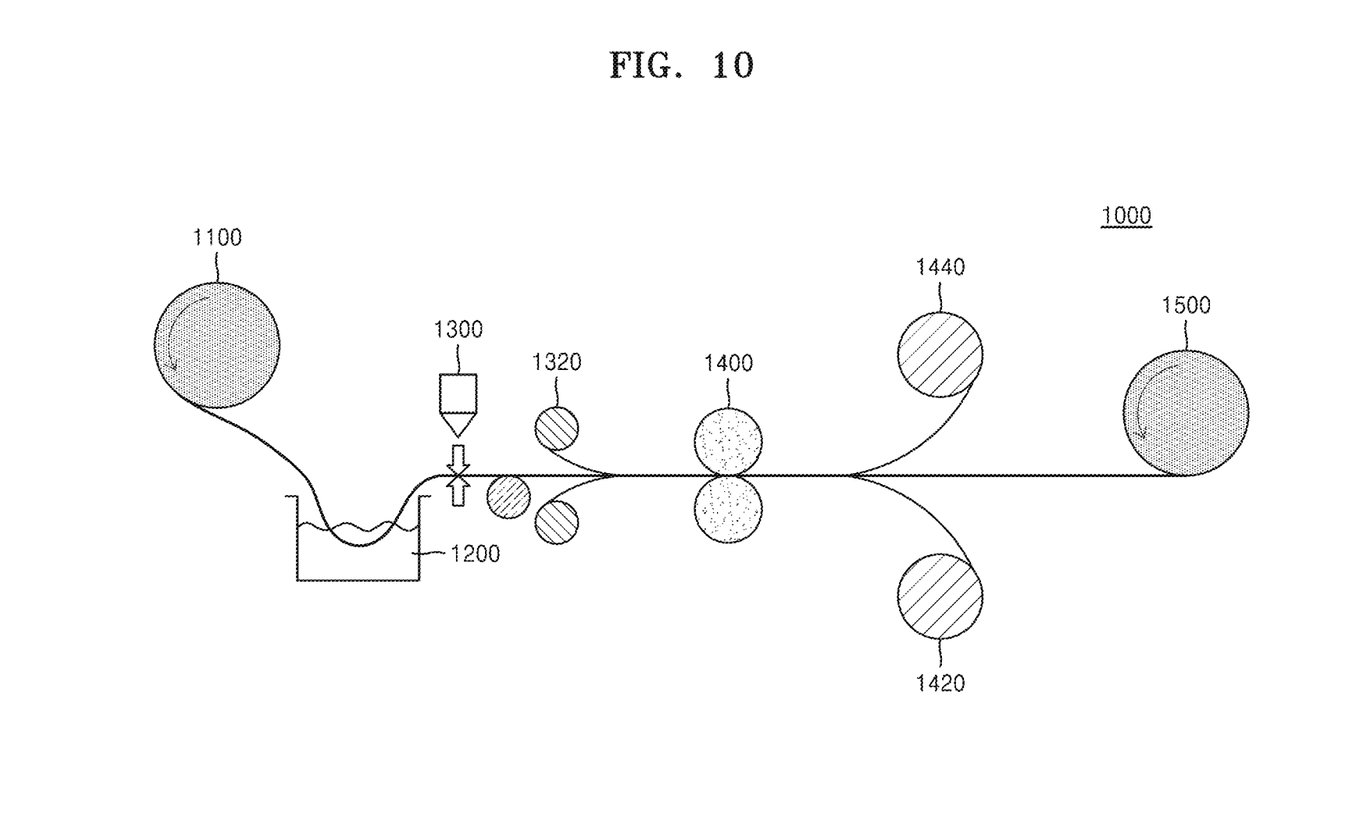
FIG. 10 is a schematic diagram of an apparatus for manufacturing an anode of a thermal battery by using a metal alloy foam according to an embodiment.
Figure 11:
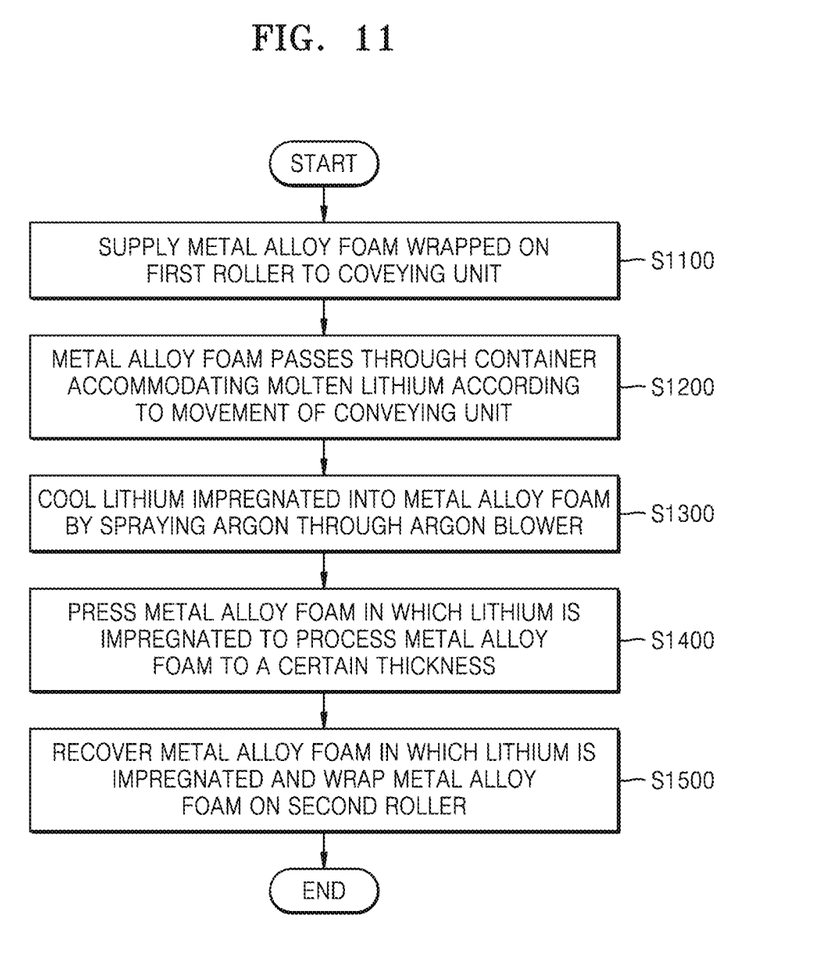
FIG. 11 is a flowchart of a method of manufacturing an anode of a thermal battery according to the apparatus for manufacturing an anode of a thermal battery of FIG. 10.

FIG. 10 is a schematic diagram of an apparatus for manufacturing an anode of a thermal battery by using a metal alloy foam according to an embodiment, and FIG. 11 is a flowchart of a method of manufacturing an anode of a thermal battery according to the apparatus for manufacturing an anode of a thermal battery of FIG. 10.

Hereinafter, as an apparatus 1000 manufacturing, an anode of a thermal battery including a metal alloy foam and a method of manufacturing the same, the apparatus 1000 manufacturing the anode of the thermal battery which produces a large amount of the anodes of the thermal battery by introducing a roll-to-roll operation and reduces operation time and manufacturing cost, and the method of manufacturing the apparatus 1000 are described.

Generally, the roll-to-roll operation refers to an apparatus that performs various types of operations on a flexible film wrapped in a roll form. Such a roll-to-roll operation apparatus is configured by a film operation unit in which various operations with respect to a film are performed, and a film transport unit that unrolls a film wrapped in a roll form to supply the film to the film operation unit or wraps and recovers a film that has been processed from the film operation unit again in a roll form.

The apparatus 1000 for manufacturing an anode of a thermal battery according to embodiments and a method of manufacturing the same aim on that a metal alloy foam is thin and flexible like a film and sequentially perform a series of roll-to-roll operations on the metal alloy foam, thereby drastically reducing the operation time and manufacturing cost.

The apparatus 1000 for manufacturing an anode of a thermal battery according to embodiments may include a first roller 1100 that releases a metal alloy foam which is wrapped to supply the metal alloy foam to a conveying unit, a container 1200 accommodating molten lithium, an argon blower 1300 cooling the lithium impregnated into the metal alloy foam by spraying argon, a press roller 1400 pressing and processing the metal alloy foam in which the lithium is impregnated, and a second roller 1500 recovering and wrapping the metal alloy foam in which the lithium is impregnated.

First, in operation S2100, according to the apparatus 1000 for manufacturing an anode of a thermal battery and a method of manufacturing the same according to embodiments, the metal alloy foam wrapped on the first roller 1100 may be provided to the conveying unit. The metal alloy foam is initially wrapped on the first roller 1100. The metal alloy foam is released from the first roller 1100 and supplied to the conveying unit, according to the rotation of the first roller 1100. The metal alloy foam includes a rectangular shape. The length of one side of the metal alloy foam is 30 cm, and the thickness thereof is 0.2 mm to 5 mm.

The first roller 1100 has a diameter of 16 cm to 30 cm. The rotation speed of the first roller 1100 is 0.02 rpm to 2 rpm. The movement distance of the metal alloy foam conveying along with the conveying unit by the rotation of the first roller 1100 is 1 cm/min to 190 cm/min. The first roller 1100 has a diameter of 16 cm to 30 cm. The rotation speed of the first roller 1100 is 0.1 rpm to 2 rpm.

Then, in operation S2200, the metal alloy foam may pass through the container 1200 accommodating the molten lithium, according to the movement of the conveying unit. Container 1200 accommodates molten lithium. The metal alloy foam passes through the container 1200 through which the conveying unit passes through. The molten lithium in container 1200 maintains a temperature of 350° C. to 400° C. The container 1200 may be manufactured in various shapes, for example, a square shape, a circular shape, or the like. The volume of the container 1200 may be, for example, 10 L to 1000 L.

Next, in operation S2300, the lithium impregnated into the metal alloy foam may be cooled by spraying argon through the argon blower 1300. It is not preferable that the lithium is present as binding together after impregnation because a short circuit of the thermal battery may be caused. Accordingly, the impregnated metal alloy foam is planarized when passing through an area where argon is sprayed, such that there is no area of excess lithium.

In addition, as the metal alloy foam in which the lithium is impregnated passes through the area where argon is sprayed, lithium heated to 350° C. to 400° C. is rapidly cooled down, thereby preventing the formation of nitrides that may occur on a high-temperature lithium surface.

The argon blower 1300 may, for example, spray argon at a pressure of 50 psi to 200 psi.

Then, in operation S2400, the metal alloy foam in which the lithium is impregnated may be pressed to be processed to a certain thickness by the press roller 1400. The press roller 1400 may press the metal alloy foam in which the lithium is impregnated to process the same to have a certain thickness. A thick metal alloy foam is processed to a target thickness while passing through the press roller 1400. When an initial metal alloy foam is provided at a target thickness, a press operation may be omitted.

Film rolls 1420 and 1440 are one-time film rolls that are disposable, and the film rolls 1420 and 1440 are used to protect the surface of the press roller 1400 from the molten lithium attached to the metal alloy foam. After the metal alloy foam has passed, the film rolls 1420 and 1440 may be replaced with new film rolls 1420 and 1440. Therefore, contamination of the surface of the next metal alloy foam to be pressed by the press roller 1400 may be prevented. For example, the film rolls 1420 and 1440 have a diameter of 16 cm to 30 cm. For example, the rotation speed of the film rolls 1420 and 1440 is 0.1 rpm to 2 rpm.

The interval between a pair of press rollers 1400 is, for example, 0.2 mm to 1.5 mm. The press roller 1400 has a diameter of, for example, 16 cm to 30 cm. The rotation speed of the press roller 1400 is, for example, 0.1 rpm to 2 rpm.

Then, in operation S2500, the metal alloy foam in which the lithium is impregnated may be recovered and wrapped on the second roller 1500. The second roller 1500 may recover and wrap the metal alloy foam in which the lithium is impregnated. Finally, the metal alloy foam in which the lithium is impregnated is again wrapped on a roller and stored in a finished form.

Descriptions of the disclosed embodiments are provided to enable one of ordinary skill in the art to use or practice the disclosure. Various modifications to these embodiments will be apparent to one of the ordinary in the art of the disclosure, and the general principles defined herein may be applied to other embodiments without departing from the scope of the disclosure. Thus, the disclosure should not be limited to the embodiments presented herein but shout be interpreted in the broadest scope consistent with the principles and novel features presented herein.

The invention claimed is:

1. A lithium anode of a thermal battery, the lithium anode comprising:
   a metal alloy foam in which a plurality of pores is formed and comprising nickel (Ni), iron (Fe), chromium (Cr), and aluminum (Al) mixed in a predetermined composition ratio; and
   lithium impregnated into the metal alloy foam in a molten state and accommodated in the pores,
   wherein the chromium in the composition ratio facilitates the impregnation of the lithium into the pores and reduces the reactivity of the metal alloy foam with the lithium at an operating temperature of the thermal battery,
   the aluminum in the composition ratio facilitates the impregnation of the lithium into the pores and prevents the lithium from penetrating into a surface of the metal alloy foam, and
   a first composition ratio of the metal alloy foam comprises, with respect to 100 parts by weight of the metal alloy foam, 22 to 42 parts by weight of the nickel, 9 to 19 parts by weight of the iron, 21 to 41 parts by weight of the chromium, and 9 to 29 parts by weight of the aluminum.

2. A lithium anode of a thermal battery, the lithium anode comprising:
   a metal alloy foam in which a plurality of pores is formed and comprising nickel (Ni), iron (Fe), chromium (Cr), and aluminum (Al) mixed in a predetermined composition ratio; and
   lithium impregnated into the metal alloy foam in a molten state and accommodated in the pores,
   wherein the chromium in the composition ratio facilitates the impregnation of the lithium into the pores and reduces the reactivity of the metal alloy foam with the lithium at an operating temperature of the thermal battery,
   the aluminum in the composition ratio facilitates the impregnation of the lithium into the pores and prevents the lithium from penetrating into a surface of the metal alloy foam, and
   a second composition ratio of the metal alloy foam comprises, with respect to 100 parts by weight of the metal alloy foam, 26 to 46 parts by weight of the nickel, 6 to 26 parts by weight of the iron, 18 to 38 parts by weight of the chromium, and 10 to 30 parts by weight of the aluminum.

3. A lithium anode of a thermal battery, the lithium anode comprising:
   a metal alloy foam in which a plurality of pores is formed and comprising nickel (Ni), iron (Fe), chromium (Cr), and aluminum (Al) mixed in a predetermined composition ratio; and lithium impregnated into the metal alloy foam in a molten state and accommodated in the pores, wherein the chromium in the composition ratio facilitates the impregnation of the lithium into the pores and reduces the reactivity of the metal alloy foam with the lithium at an operating temperature of the thermal battery, the aluminum in the composition ratio facilitates the impregnation of the lithium into the pores and prevents the lithium from penetrating into a surface of the metal alloy foam, and metal alloy foam further comprises an oxygen element (O) to facilitate the impregnation of the lithium through oxidation, and a third composition ratio of the metal alloy foam comprises, with respect to 100 parts by weight of the metal alloy foam, 10 to 30 parts by weight of the nickel, 2 to 22 parts by weight of the iron, 9 to 29 parts by weight of the chromium, 2 to 22 parts by weight of the aluminum, and 9 to 29 parts by weight of the oxygen element.

4. The lithium anode of the thermal battery of claim 1, wherein the pores each have a diameter of 250 μm to 6000 μm.

5. A thermal battery comprising:
a lithium anode comprising a metal alloy foam in which a plurality of pores are formed and comprising nickel (Ni), iron (Fe), chromium (Cr), and aluminum (Al) mixed in a predetermined composition ratio and lithium impregnated into the metal alloy foam in a molten state and accommodated in the pores;

an anode current collector arranged on one surface of the lithium anode;

an electrolyte arranged on another surface of the lithium anode;

a cathode arranged opposite to the lithium anode with respect to the electrolyte; and a cathode current collector arranged opposite to the electrolyte with respect to the cathode, wherein a first composition ratio of the metal alloy foam comprises, with respect to 100 parts by weight of the metal alloy foam, 22 to 42 parts by weight of the nickel, 9 to 19 parts by weight of the iron, 21 to 41 parts by weight of the chromium, and 9 to 29 parts by weight of the aluminum, or wherein a second composition ratio of the metal alloy foam comprises, with respect to 100 parts by weight of the metal alloy foam, 26 to 46 parts by weight of the nickel, 6 to 26 parts by weight of the iron, 18 to 38 parts by weight of the chromium, and 10 to 30 parts by weight of the aluminum.

6. A lithium anode of a thermal battery, lithium anode comprising:
a metal alloy foam in which a plurality of pores are formed and comprising nickel (Ni), iron (Fe), chromium (Cr), and molybdenum (Mo) mixed in a predetermined composition ratio; and lithium impregnated into the metal alloy foam in a molten state and accommodated in the pores, wherein the chromium in the composition ratio facilitates the impregnation of the lithium into the pores, and the molybdenum in the composition ratio prevents the metal alloy foam from reacting with lithium and melting, a first composition ratio of the metal alloy foam comprises, with respect to 100 parts by weight of the metal alloy foam, 47 to 67 parts by weight of the nickel, 1 to 33 parts by weight of the iron, 13 to 33 parts by weight of the chromium, and 1 to 14 parts by weight of the molybdenum.

7. A lithium anode of a thermal battery, lithium anode comprising:
a metal alloy foam in which a plurality of pores are formed and comprising nickel (Ni), iron (Fe), chromium (Cr), and molybdenum (Mo) mixed in a predetermined composition ratio; and lithium impregnated into the metal alloy foam in a molten state and accommodated in the pores, wherein the chromium in the composition ratio facilitates the impregnation of the lithium into the pores, the molybdenum in the composition ratio prevents the metal alloy foam from reacting with lithium and melting, and a second composition ratio of the metal alloy foam comprises, with respect to 100 parts by weight of the metal alloy foam, 47 to 67 parts by weight of the nickel, 1 to 33 parts by weight of the iron, 13 to 33 parts by weight of the chromium, 1 to 14 parts by weight of the molybdenum, and 1 to 11 parts of weight of silicon.

8. The lithium anode of the thermal battery of claim 6, wherein the lithium anode does not comprise a cup or mesh to maintain the shape of the metal alloy foam.

9. A thermal battery comprising:
a lithium anode comprising a metal alloy foam in which a plurality of pores are formed and comprising nickel (Ni), iron (Fe), chromium (Cr), and molybdenum (Mo) mixed in a predetermined composition ratio and lithium impregnated into the metal alloy foam in a molten state and accommodated in the pores;

an anode current collector arranged on one surface of the lithium anode;

an electrolyte arranged on another surface of the lithium anode;

a cathode arranged opposite to the lithium anode with respect to the electrolyte; and a cathode current collector arranged opposite to the electrolyte with respect to the cathode, wherein a first composition ratio of the metal alloy foam comprises, with respect to 100 parts by weight of the metal alloy foam, 22 to 42 parts by weight of the nickel, 9 to 19 parts by weight of the iron, 21 to 41 parts by weight of the chromium, and 9 to 29 parts by weight of the aluminum, or wherein a second composition ratio of the metal alloy foam comprises, with respect to 100 parts by weight of the metal alloy foam, 26 to 46 parts by weight of the nickel, 6 to 26 parts by weight of the iron, 18 to 38 parts by weight of the chromium, and 10 to 30 parts by weight of the aluminum.

\* \* \* \* \*